(12) United States Patent
Frampton et al.

(10) Patent No.: US 11,711,034 B2
(45) Date of Patent: Jul. 25, 2023

(54) SENSORLESS POSITION DETECTION FOR ELECTRIC MACHINE

(71) Applicant: Kohler Co., Kohler, WI (US)

(72) Inventors: Isaac S. Frampton, Strattanville, PA (US); Adam Larson, Mequon, WI (US); Jonathan Bykowski, Shorewood, WI (US)

(73) Assignee: KOHLER CO.

( * ) Notice: Subject to any disclaimer, the term of this patent is extended or adjusted under 35 U.S.C. 154(b) by 0 days.

(21) Appl. No.: 17/529,127

(22) Filed: Nov. 17, 2021

(65) Prior Publication Data

US 2022/0173680 A1    Jun. 2, 2022

Related U.S. Application Data

(60) Provisional application No. 63/119,968, filed on Dec. 1, 2020.

(51) Int. Cl.
   *H02P 7/00*    (2016.01)

(52) U.S. Cl.
   CPC ................. *H02P 7/0094* (2013.01)

(58) Field of Classification Search
   CPC ......... H02P 7/0094; H02P 6/007; H02P 27/08
   See application file for complete search history.

(56) References Cited

U.S. PATENT DOCUMENTS

| | | | |
|---|---|---|---|
| 5,107,195 A | 4/1992 | Lyons et al. | |
| 6,674,191 B2 | 1/2004 | Kujira | |
| 7,064,509 B1 | 6/2006 | Fu et al. | |
| 7,668,690 B2 | 2/2010 | Schneider et al. | |
| 7,800,321 B2 | 9/2010 | Knittel et al. | |
| 8,339,078 B2 | 12/2012 | Hui | |
| 8,847,538 B2 | 9/2014 | Bruhn et al. | |
| 9,667,127 B2 | 5/2017 | Roos | |
| 2007/0013331 A1 | 1/2007 | Kalb | |
| 2012/0013282 A1 | 1/2012 | Introwicz | |

(Continued)

FOREIGN PATENT DOCUMENTS

| | | |
|---|---|---|
| CN | 105827161 B | 8/2018 |
| EP | 3533995 A1 | 9/2019 |
| JP | H10136677 A | 5/1998 |

(Continued)

OTHER PUBLICATIONS

Extended European Search Report 21210228.9 dated Apr. 19, 2022.

(Continued)

*Primary Examiner* — Said Bouziane
(74) *Attorney, Agent, or Firm* — The Belles Group, P.C.

(57) ABSTRACT

An electric machine includes a rotor, a stator, at least one measurement circuit, and a controller. The rotor includes a plurality of salient poles arranged radially around a rotation axis of the electric machine and spaced apart from the rotation axis of the electric machine. The stator includes a plurality of coils configured to selectively align with the plurality of salient poles of the rotor. The at least one measurement circuit is configured to measure at least one current through at least one of the plurality of coils. The measured current includes a current ripple. The controller configured to compute a position of the rotor based on a characteristic of the current ripple.

16 Claims, 12 Drawing Sheets

(56) References Cited

U.S. PATENT DOCUMENTS

2020/0373863 A1* 11/2020 Millinger ............... H02P 6/007

FOREIGN PATENT DOCUMENTS

| | | | |
|---|---|---|---|
| JP | H11187687 A | | 7/1999 |
| JP | 2015142451 A | * | 8/2015 |
| JP | 6388299 B2 | | 8/2018 |
| JP | 2019041495 A | | 3/2019 |
| KR | 20190123529 A | | 11/2019 |
| WO | 2019137933 A1 | | 7/2019 |

OTHER PUBLICATIONS

"Automotive Brushed-motor Ripple Counter Reference Design for Sensorless Position Measurement" Texas Instruments. Jun. 2018. (pp. 1-21). Source: http://www.ti.com/lit/ug/tidud30a/tidud30a.pdf.
Abacan, Aldrin et al, "Sensorless Position Control of Brushed DC Motor Using Ripple Counting Technique." Microchip, 2019. (pp. 1-50). Source: http://ww1.microchip.com/downloads/en/AppNotes/Sensoriess-Position-Control-of-Brushed-DC-Motor-Using-Ripple-Counting-Technique-00003049A.pdf.
Labriola, Donald, "A New Option for Motor-position Feedback: Built-in Resolver Design." Machine Design, Motors and Drives. Mar. 3, 2014. (pp. 1-7). Source: https://www.machinedesign.com/motors-drives/article/21833527/a-new-option-for-motorposition-feedback-builtin-resolver-design.

* cited by examiner

SENSORLESS POSITION DETECTION FOR ELECTRIC MACHINE

CROSS REFERENCE TO PRIOR APPLICATION

This application claims priority benefit of Provisional Application No. 63/119,968 filed Dec. 1, 2020, which is hereby incorporated by reference in its entirety.

TECHNICAL FIELD

This disclosure relates in general to the field of electric machines including motors and generators, and in particular, the detection of position of a rotor in an electric machine.

BACKGROUND

An electric machine includes one or more electromagnetic components. Control of the electronic machine may depend on position sensing dependent on physical detection of the one or more electromagnetic components. However, this type of sensing suffers from errors in accuracy and difficult in calibration.

DESCRIPTION

An electric machine may be an electromagnetic rotating machine that includes a rotor and a stator. The rotor and stator are positioned on opposite sides of an air gap through which a magnetic field is present and magnetic flux flows between the rotor and the stator. The magnetic field may be created by permanent magnets or by current flowing in a winding. While other examples are possible, the electric machine may be a motor or a generator. The generator, which may be referred to as an engine-generator set or a genset, may include a power source (e.g., an engine) and an alternator or another device for generating electrical energy or power from mechanical energy. The motor, on the other hand, receives electrical energy and converts it to mechanical energy by outputting torque.

Controlling an electrical machine often requires feedback of absolute or relative position of the rotating element, called the rotor. This position is often measured using a position sensor. The position sensor can utilize a variety of different techniques, such as mechanical sensors, mechanical commutators, optical sensors, variable reluctance sensors, and hall effect sensors. These sensors often require shielding against the electromagnetic fields generated inside the electrical machine. Many of these sensors require additional processing to remove noise of other effects from fields generated by electric currents entering, leaving or contained within the electrical machine. Many of these sensors require movement of the machine to determine position of the machine. In many cases, multiple sensors are required to accurate determine rotational direction for the electrical machine or to provide redundancy for the position sensing.

Electrical machines are often coupled to engines. In this case, the engine is often controlled by an engine control unit (ECU). The ECU often requires engine position information for appropriate sequencing of certain engine actuators, such as fuel injectors, ignition devices, emissions control devices, protective functions, or control of the engine speed. The ECU often receives engine position from one or more sensors mounted on the engine. In some cases, these sensors may provide a degree of redundancy or the ECU may have logic that allows estimation of a sensor input from other sensor inputs to provide redundancy allowing the engine to operate after a loss of a sensor. In applications where an electrical machine is coupled to the engine, additional shielding may be required for the engine position sensors due to the electromagnetic fields created by the electrical machine.

Figure 1:
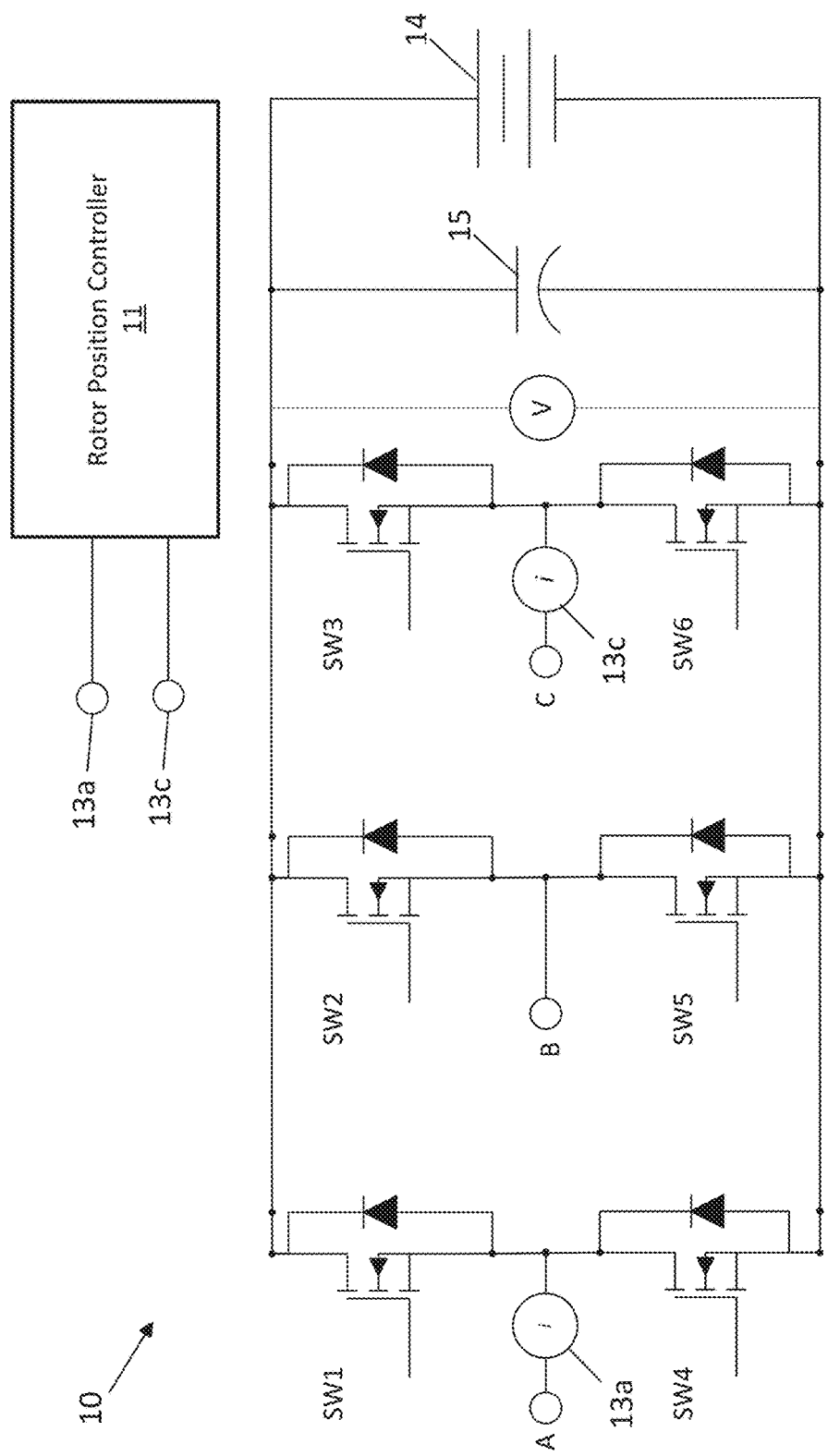
FIG. 1 illustrates an example circuit for controlling the electrical behavior of an electric machine.
Figure 2:
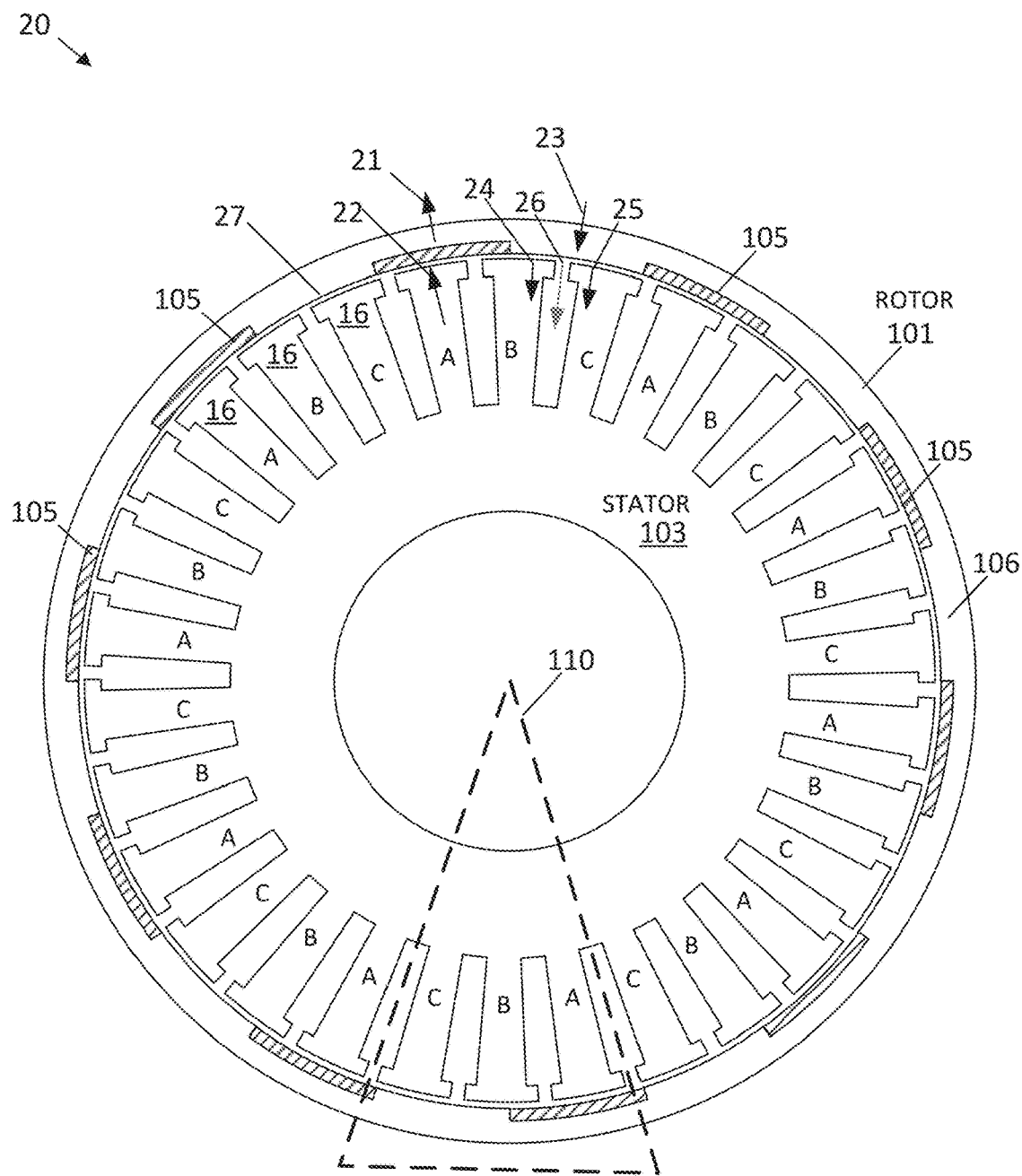
FIGS. 2, 3, and 4 illustrate various positions for the electrical machine.

FIG. 1 illustrates a representative circuit 10 for controlling the electrical behavior of stator windings in an electric machine 20, illustrated by FIG. 2. The electric machine 20 includes at least a rotor 101 and a stator 103. The rotor 101 includes salient poles 105 arranged radially around a rotation axis of the electric machine 20 and spaced apart from the rotation axis of the electric machine. The stator 103 includes coils or windings wrapped around teeth 16 and corresponding to the salient poles 105 of the rotor 101. The salient poles 105 come into and out of alignment with the teeth of the stator 103 as the electric machine 20 operates. The number of salient poles 105 may be equal to the number of teeth 16 for each of the phases. In the example illustrated, the rotor includes 10 salient poles and the stator includes 30 teeth, 10 each for each of the phases.

Figure 3:
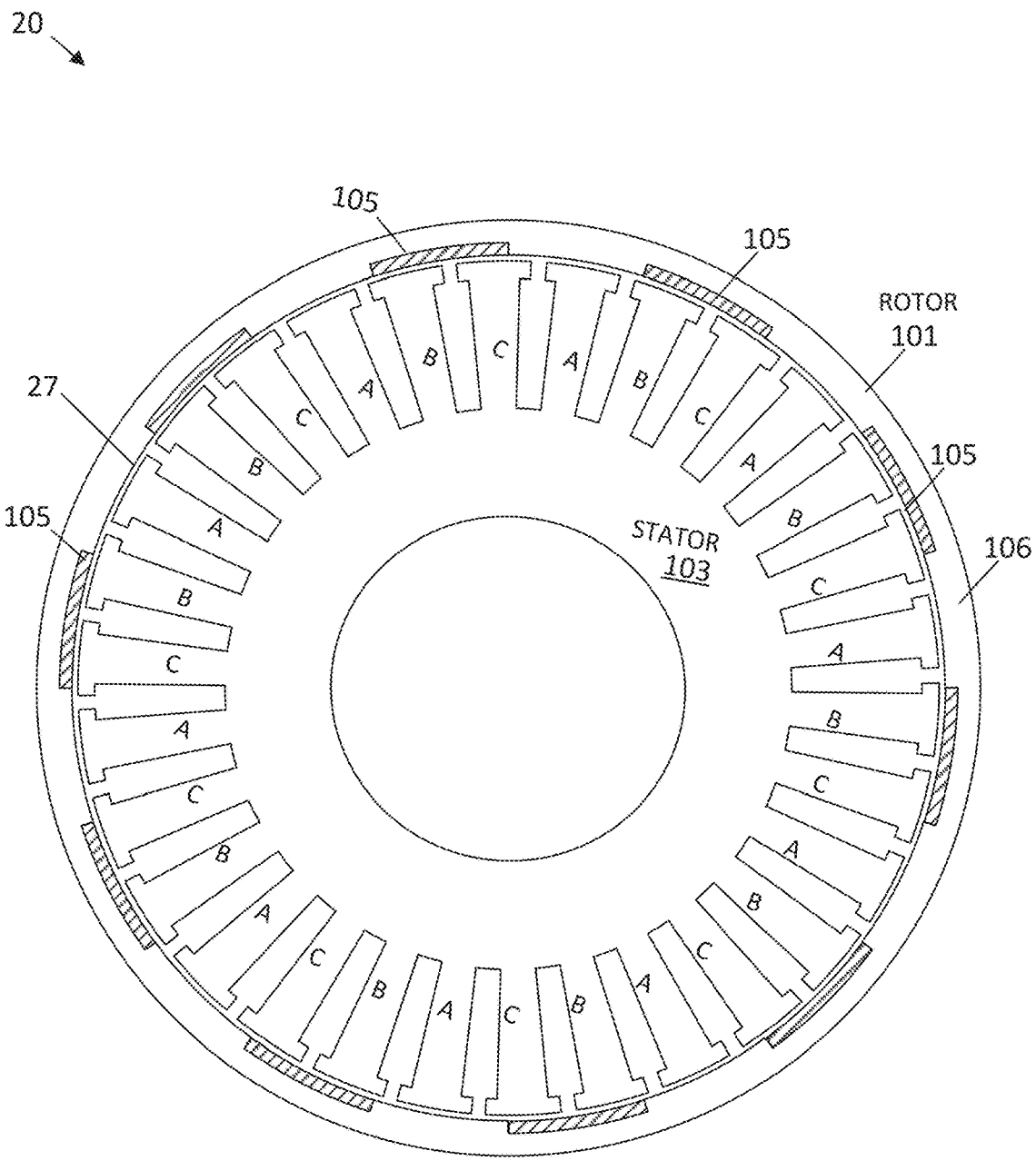
Figure 4:
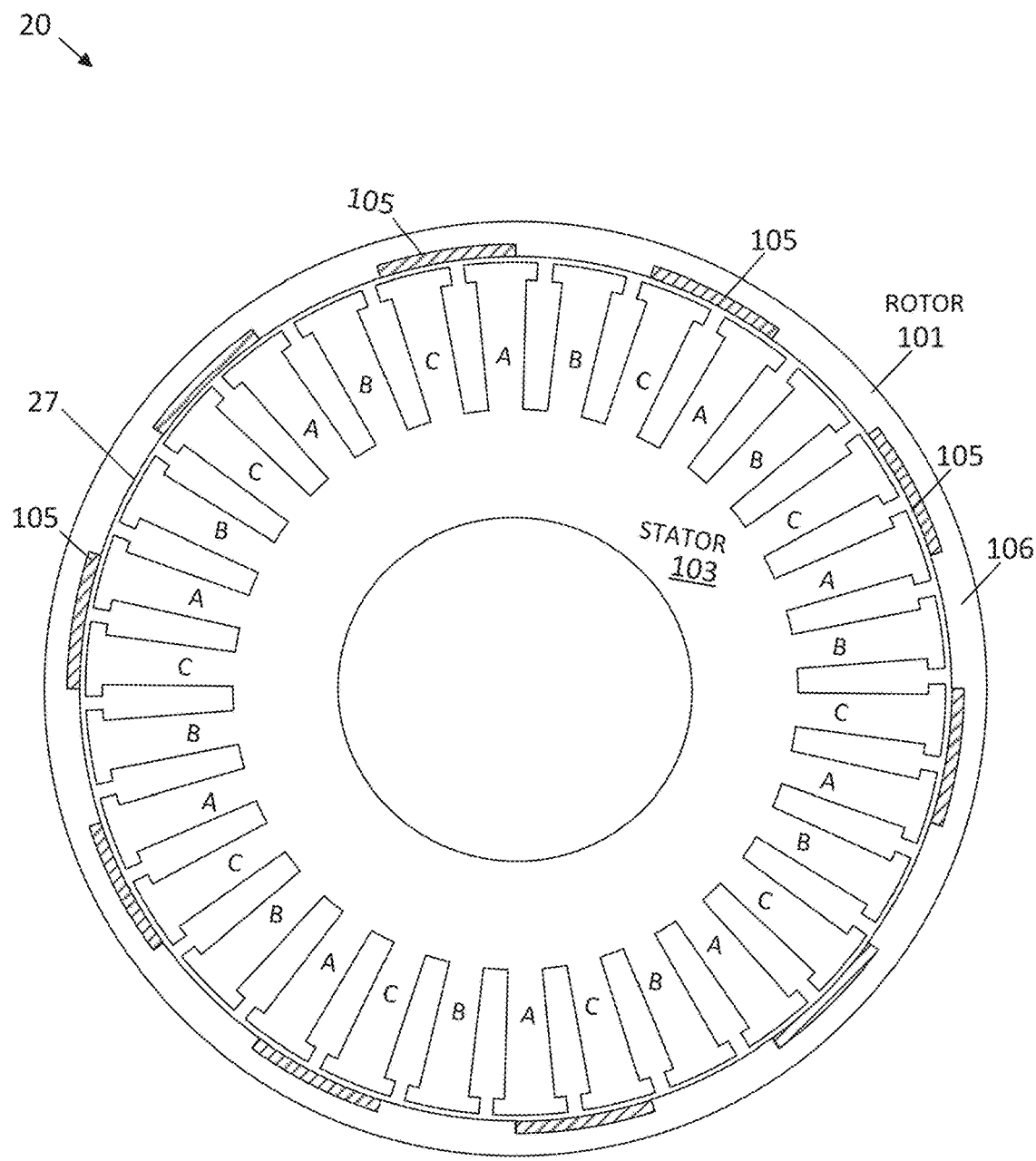

While an external rotor electrical machine is illustrated, including rotor 101 rotating around stator 103, the opposite configuration may be used, including a rotor that rotates within the stator. The electrical machine illustrated in FIGS. 2-4 represents an electrical machine with permanent magnets generating a large part of the flux within the electrical machine. This type of machine is a permanent magnet machine (or a permanent magnet motor or a permanent magnet generator, depending on the application).

The circuit 10 includes switches to control three phases A, B, and C, each corresponding to a different portion of the stator 103 (i.e., a different subset of the stator windings). The portion of circuit 10 labeled for phase A, B, or C provides current to the windings around teeth 16 labeled A, B, or C, respectively, in FIG. 2. Each portion of the circuit 10 provides a current to a corresponding set of the stator windings of the electric machine 20. Each portion of the circuit 10 includes a pair of switches SW. Phase A of the circuit includes switches SW1 and SW4, phase B of the circuit includes switches SW2 and SW5, and phase C of the circuit includes switches SW3 and SW6. For example, a controller (e.g., controller 11) may turn the switches on and off in order to supply current from source 14 to the corresponding windings of the electric machine 20. The rate that the controller switches between the pair of switches may be referred to as the switching frequency or carrier frequency.

The circuit 10 also contains at least one measurement circuit configured to measure at least one current through at least one of the coils (e.g., of the stator windings). A sensor 13 measures the current that flows through the corresponding section of the circuit 10. The measurement circuit may include at least the sensor 13, conditioning circuit elements, sampling circuit elements, or other components. For example, a first measurement circuit is for a first phase or a first coil of the plurality of coils, a second measurement circuit is for a second phase or a second coil of the plurality of coils, and a third measurement circuit is for a second phase or a second coil of the plurality of coils.

A current sensor or ammeter is illustrated but other types of sensors may be used such as a voltage sensor, a hall-effect sensor or an induction sensor. The current that flows to the phases of the electric machine 20 depends on a variety of factors. The current may vary based on electrical properties of the circuit such as the number of the coils, size of the coils, length of the coils, resistance of the coils, or others. The current may vary based on magnetic properties of the circuit such as the reluctance for the magnetic flux path through the iron associated with the tooth of the stator for the phase and the portion of the rotor aligned with the tooth of the stator. The reluctance is the property of the magnetic flux path that tends to oppose the flow of magnetic flux. Where reluctance is the highest, magnetic flux flows the least for a given applied magnetomotive force (MMF) applied to the magnetic circuit.

A controller is configured to calculate a first current ripple for the first phase from the first measurement circuit, calculate a second current ripple for the second phase from the second measurement circuit, and calculate a third current ripple for the third phase from the second measurement circuit. The controller may be configured to select the highest value between the first current ripple and the second current ripple. The controller may be configured to a direction of the rotor based on the first current ripple for the first phase and second current ripple for the second phase.

The reluctance for the magnetic flux path varies depending on the relative position of the rotor and stator. For any given position, the magnetic flux path for phases A, B, and C are different. There may be some instances where two of the phases have the same magnetic flux path length, but they will deviate in the next sample point. The controller may identify a highest reluctance path based on the first current ripple and the second current ripple and select a rotor position based on the highest reluctance path. The controller is configured to calculate a ripple for a third phase from an output of the first measurement circuit and the output of the second measurement circuit.

FIGS. 2-4 provide three different views of an example permanent magnet electrical machine with the rotor in different positions relative to the stator. The rotor contains permanent magnets magnetized to provide a north pole 21 facing outwards and a south pole facing the air gap 27 between the rotor and stator. The flux returning in a closed path causes an additional north pole 23 facing the air gap 27, called a consequent pole, in the ferrous material comprising the rotor where it borders the air gap 27.

It is important to note that although a radial air gap machine is shown, the methods and techniques described herein are equally applicable to an axial airgap machine or any other machine configuration with pole saliency.

For illustrative purposes, considering the symmetry of the electrical machine, discussions regarding the position of the rotor relative to the stator can be simplified to only consider a single pole pair of the electrical machine. A pole pair is comprised of a north and a south pole passing through the air gap 27 between the rotor and the stator. For the electrical machine 20 illustrated in FIGS. 2-4, each pole pair on the rotor has three corresponding teeth in the stator, representing three phases, A, B, and C, corresponding to the three phases connected to circuit 10.

Any set of three consecutive teeth, which has one tooth corresponding to phase A, one tooth corresponding to phase B and one tooth corresponding to phase C has similar behavior in the electrical machine 20 because south poles 105 of the rotor 101 maintain a consistent position to all A, B, and C phase teeth in the stator 103, so it is only necessary to consider a single set of three teeth. FIG. 2 illustrates a time where the tooth 16 for phase A is most aligned with the pole 105, FIG. 3 illustrates a time where the tooth 16 for phase B is most aligned with the pole 105, and FIG. 4 illustrates a time where the tooth 16 for phase C is most aligned with the pole 105.

The current through all of windings for phases A, B, and C adds to zero (e.g., A+B+C=0) so that the current leaving the windings in any two phases equals the current returning to the windings in the third phase. Thus, the current measured by any two of the sensors for two phases (e.g., sensor 13a and sensor 13c) can be used to calculate the current in the third phase. Alternatively, three or more sensors may be used.

FIG. 2 illustrates the magnetic field generated by current flowing into phase A 22 and out of both phase B 24 and phase C 25, creating a resultant magnetic field 26. The desire for magnetic flux in the rotor to align with magnetic flux in the stator generates a torque in the electrical machine because the field generated by current in phase A 22 is rotated slightly relative to the south pole in the rotor 21. The same effect generates an additive torque due to the misalignment of the resultant magnetic field 26 and the north pole in the rotor 23. This torque may cause the electrical machine to act as a motor or a generator, depending on the direction that the electrical machine is rotating.

One example to control an electric machine such as a permanent magnet machine illustrated in FIGS. 2-4 involves adjusting the position of the magnetic flux in the stator relative to the position of the magnetic flux in the rotor such that the magnetic flux in the stator lies at a desired rotational angle relative to the magnetic flux in the rotor. The position of the rotor may be necessary to control the magnetic flux in the stator relative to the magnetic flux in the rotor, thus rotor position sensing is useful. A method for detecting the position of the rotor using measurements of the current provided to the stator is disclosed herein.

One technique for supplying current to the stator windings in the electrical machine 20 involves applying periodically applying voltage from a direct current (DC) bus to the stator windings in the electrical machine. In some conditions, such as when the voltage is positive, the current in the stator windings of the electrical machine 20 will increase. In other cases, such as when the voltage is negative, the current in the stator windings of the electrical machine 20 will decrease. In many cases, this voltage is periodically applied for a fixed portion of the periodic cycle time, occurring at the switching frequency. This periodic application of voltage for a fixed portion of the periodic cycle is referred to as a duty cycle.

The current flowing through the stator windings of the electrical machine 20 may be measured by sensors 13. The increasing and decreasing current in the stator windings of the electrical machine 20 may result in a current ripple. The current ripple is a time-varying deviation on the current applied to the stator windings and can be expressed as a Root Mean Squared (RMS) quantity a peak to peak (difference between maximum and minimum) a component or combination of components from a Fourier transform of the signal, or some other measurement of time-varying signal amplitude. Current ripple is typically a side effect of controlling current and is often differentiated from the average current, which is often the quantity under control by a controller.

Figure 5:
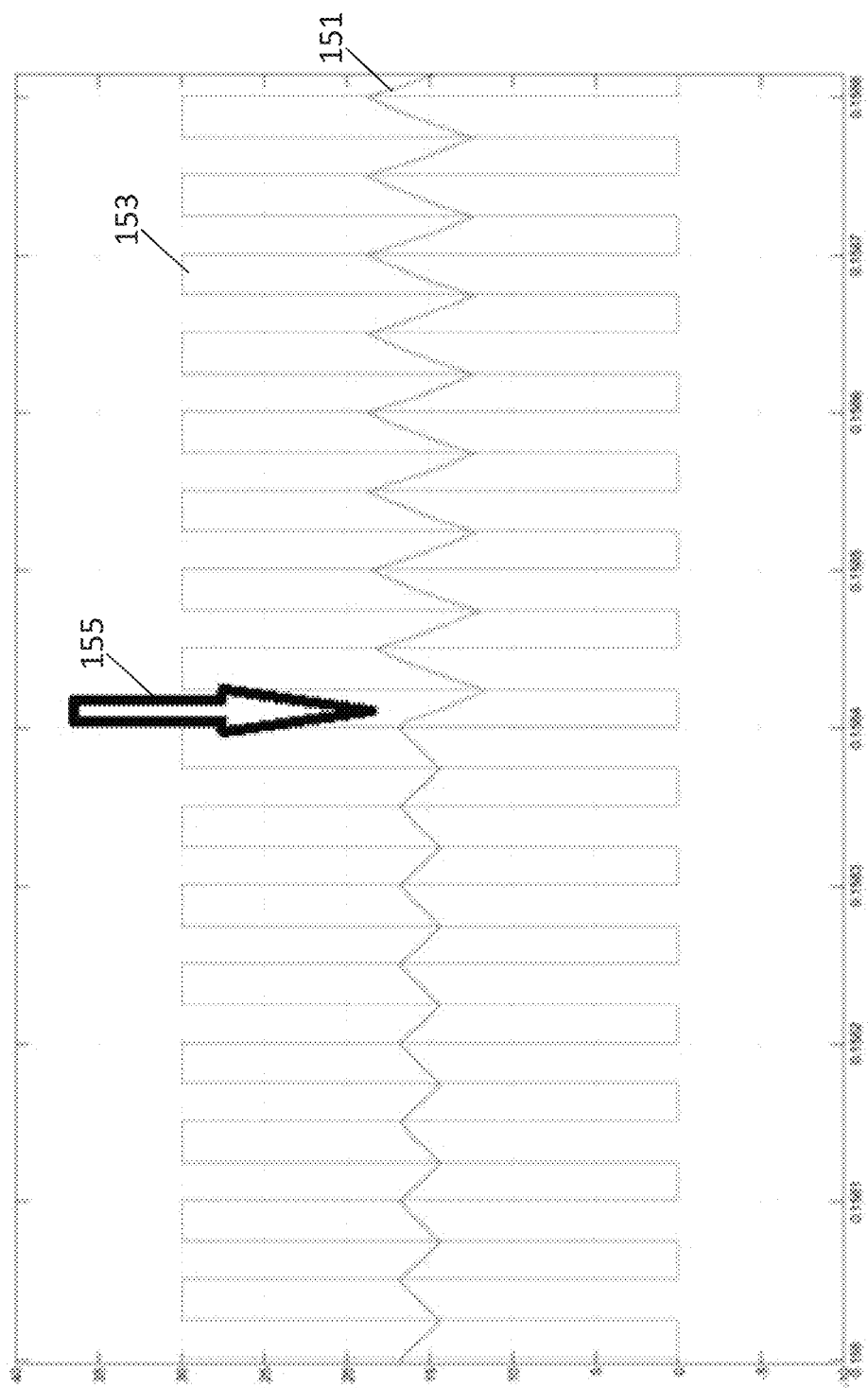
FIG. 5 illustrates an example current ripple for the electrical machine.

FIG. 5 illustrates an example current ripple 151. The current ripple 151 changes at a point indicated by arrow 155. The current ripple may vary due to a variety of factors, including applied voltage, applied duty cycle 153, internally generated voltage, switching frequency, or the effective inductance of the stator winding. The effective inductance of the stator coil may depend on several factors, including a saturation level of the machine, temperature of materials, and the effective reluctance of the path that the magnetic flux will follow. This path may include portions of the rotor and portions of the stator. The reluctance of the path is typically dominated by the permeability of the materials present in the path. Ferrous materials may have permeabilities thousands of times higher than air or many rare-earth magnetic materials, causing a notable change in reluctance of a magnetic flux path and similarly changing the effective inductance of the stator winding and the current ripple 151.

In most conditions, the ripple current 151 is dominated by the inductive characteristics of the stator windings of the electrical machine 20. The inductive characteristics result in current changing at a rate that is defined by the quotient of the voltage applied across the winding and the inductance of the winding. Lower inductance will allow the current to increase and decrease more quickly, resulting in a larger ripple current. Higher inductance will reduce the rate of change for the current, resulting in a smaller ripple current.

In a salient pole electrical machine, some portions of the rotor, stator, or both the rotor and the stator have more high permeability ferrous materials than other portions of the rotor, stator or both rotor and stator. For salient pole machines, the effective path reluctance varies with the position of the electrical machine. Often, the effective inductance and thereby current ripple on a stator winding in the electrical machine 20 will also vary with the position of the electrical machine.

In many cases, the reluctance of the magnetic path will be different for different phases of the electrical machine 20. As illustrated in FIG. 2, the reluctance for windings on phase A of the electrical machine 20 may be significantly higher than the reluctance for windings on phase B because the permeability of the material in the permanent magnet 105 may be lower by a significant factor, such as 1,000, 2,000 or 10,000 and much more of this material lies in the magnetic path for phase A than lies in the path for phase C. The reluctance for windings on phase B may be higher than the reluctance for windings on phase C for similar reasons.

Figure 6:
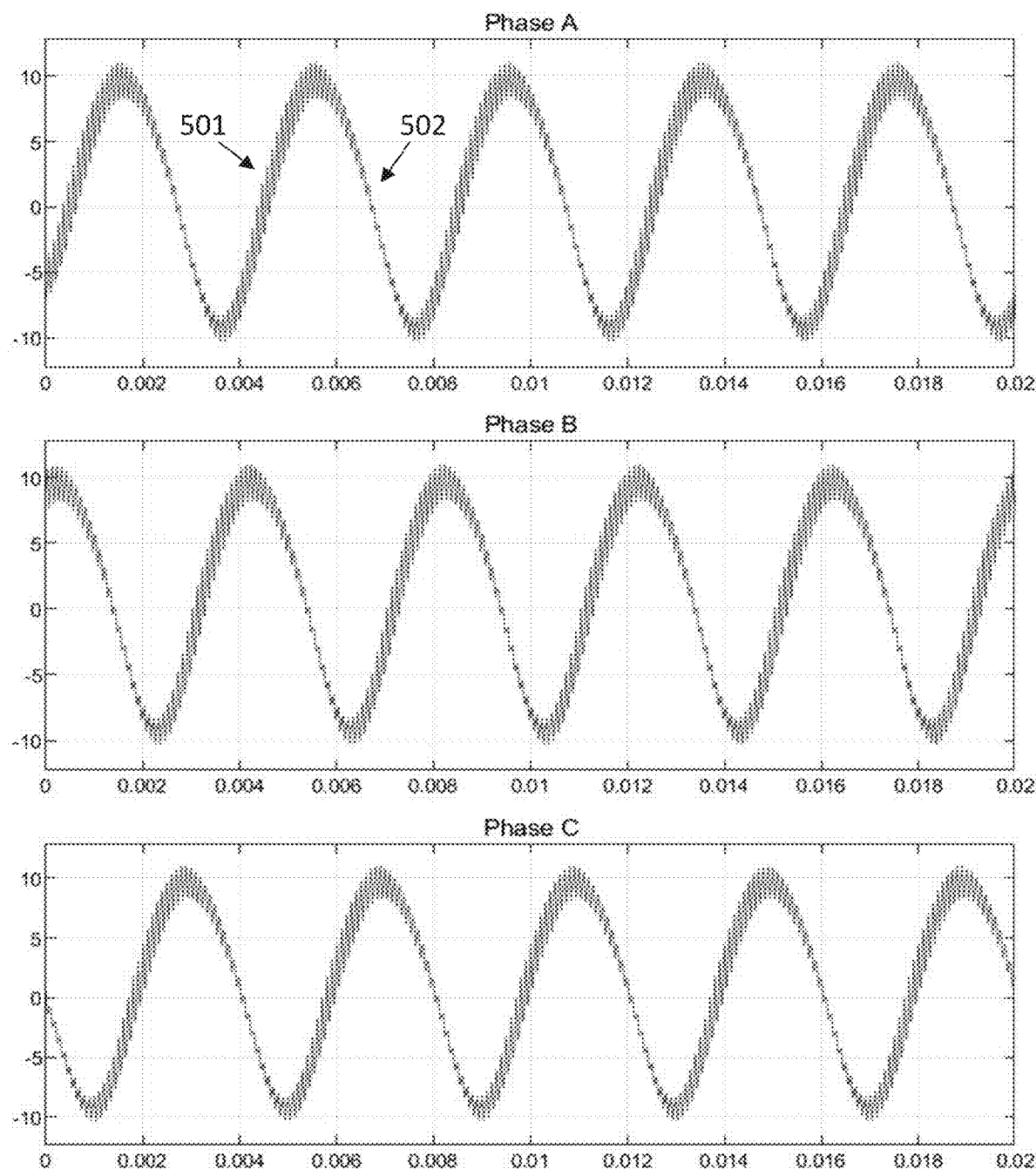
FIG. 6 illustrates an example representative current waveform applied to the windings of an alternator with pole saliency.

FIG. 6 illustrates a representative current waveform applied to the windings of an alternator with pole saliency. FIG. 6 Illustrates example current waveforms for three phases of an electrical machine like that illustrated in FIGS. 2-4. The ripple on the current waveforms in FIG. 6 may be caused by subsequent application and removal of a DC voltage following an applied duty cycle at a switching frequency, such as 10 kHz. The current ripple on phase A of the stator windings in the electrical machine 20 may increase when phase A is in line with the permanent magnet generating the south pole 105 of the rotor 101 as shown in region 501. The current ripple on phase A of the stator windings in the electrical machine 20 may decrease when phase A is in line with the ferrous material generating the north pole of the rotor 101 as shown in region 502. For the example in FIG. 6, the electrical machine of FIG. 2 is rotated counterclockwise at a speed of 1500 RPM, with the stator winding current cycling through the phases of each pole pair at 250 Hz.

The controller 11 is configured to receive sampled values of the current on each phase from the respective sensor 13. This current may be measured directly or calculated from other currents, voltages, switch states, predictive models, temperatures, etc. The controller 11 may identify a set of samples for a predetermined time period, which may be related to the period or frequency of the current ripple. As an example, the predetermined time period may be based on a switching frequency of the drive circuit 10, which drives the frequency of the current ripple.

The predetermined time period may correspond to a switching frequency for generation of the applied signal. For example, the predetermined time period may span a set number of periods of the switching frequency. The predetermined time period may correspond to a sampling frequency used by the sensor 13. For example, the predetermined time period may span a set number of samples or measurements.

One way to express the current ripple 151 is as a peak to peak quantity, computed as the difference between a maximum current value and a minimum current value occurring in a predetermined time period. The predetermined time period may by the switching period of the controller 11 or another predetermined time period. The controller 11 may sort the samples over the predetermined time period and compare the samples to identify the maximum current value and the minimum current value.

Figure 7:
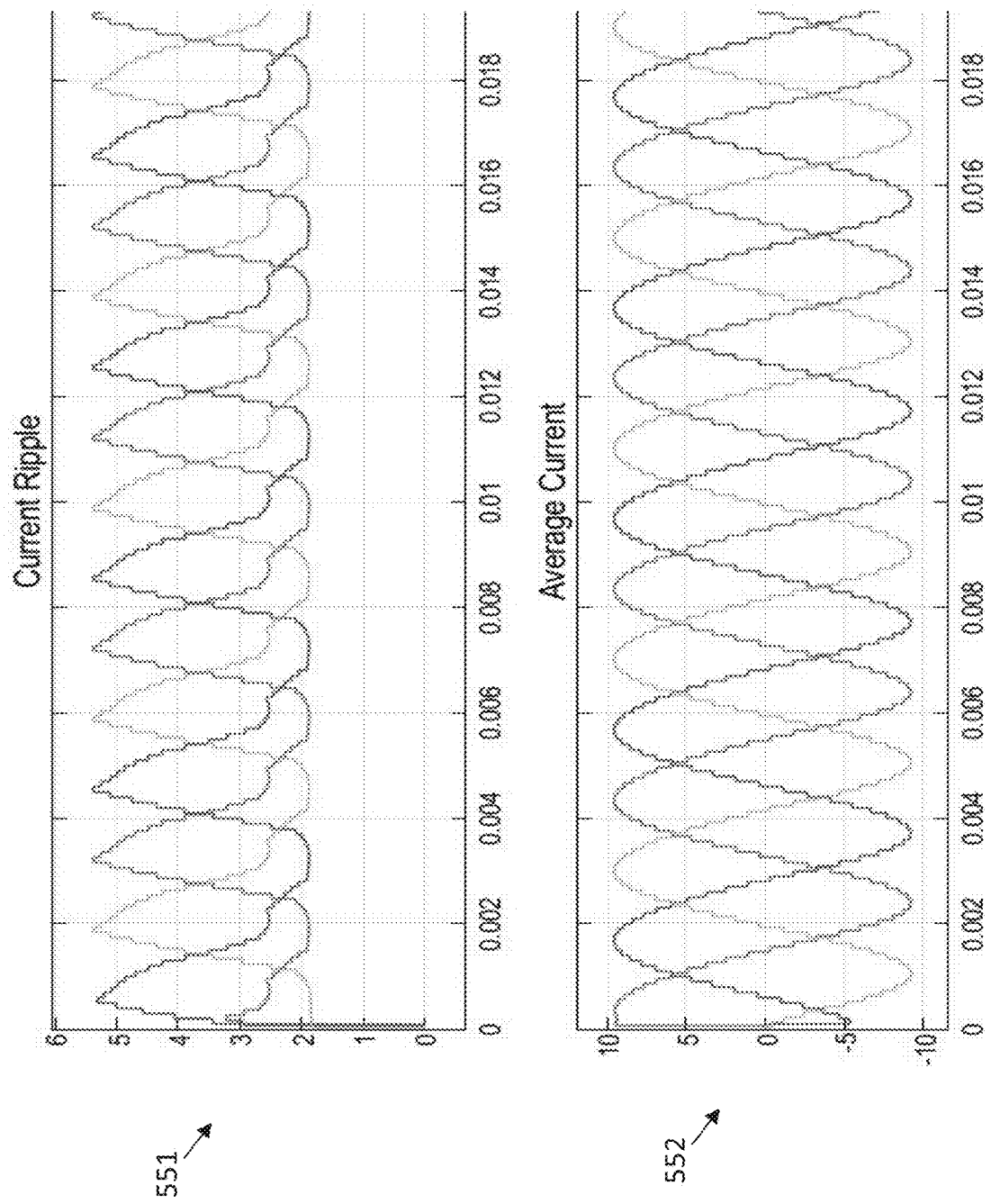
FIG. 7 illustrates an example plot of current ripple and average current.

FIG. 7 illustrates an example calculation of current ripple (e.g., plot 551) and average current (e.g., plot 552). Alternator position may be determined based on the degree of current ripple in the windings of an alternator with pole saliency. The current ripple illustrates a raw difference in a minimum and maximum measurement of the current in the winding over a switching period. Average current illustrates an example computed average current over a switching period. A switching period is typically the time required for a periodic switching signal to repeat similar behavior or characteristics.

For this example, the controller 11 tracks a minimum, maximum and average value for each period and calculates the current ripple 151 for the period as the difference between the maximum current value and the minimum current value in this time period at the end of each period. The controller 11 also reports the average value form each period as the arithmetic mean of the samples acquired during the period. The computed current ripples for phase A 601, phase B 602 and phase C 603 provide similar information at different times. For the example in FIG. 7, the electrical machine of FIG. 2 is rotated counterclockwise at a speed of 1500 RPM, with the stator winding current cycling through the phases of each pole pair at 250 Hz.

It is important to note that, in many cases, the current ripple characteristic relating to rotor position relative to the stator may be evident even when the current in the stator windings of the electrical machine 20 has a zero or nearly zero magnitude. Similarly, the current ripple may be measurable and significant for determining rotor position without need for a time-varying average drive current. In other words, the ripple current on each phase of the stator windings in the electrical machine 20 may provide accurate position indication without the machine rotating or providing torque.

Equally important to note is that sensing current ripple on multiple phases to determine rotor position may provide directional information (the sequence that the rotor passes the stator teeth 16 indicating direction) as well as redundancy (each phase providing a position sensor).

Determining a position of the rotor 101 may involve comparing a measured current ripple on one or more windings on the teeth 16 of the stator 103 of the electrical machine 20 to a threshold to determine a time that the rotor 101 was in a specific position. In an example embodiment of this technique, the controller 11 is configured to compare the current ripple to a threshold and determine a position of the rotor based on the comparison. Because the permeability of the magnetic path is linked to the position of rotor south pole 105, rotation of the rotor causes regular and predictable fluctuations in the reluctance and thereby the current ripple. The current ripple reaches the threshold with the rotor in a certain position.

When determining the rotor position by comparing the current ripple to a threshold, the threshold may be adjusted or modified by factors such as the applied voltage (the voltage on the DC bus), the switching frequency, a saturation level in the electrical machine, the average current ripple for a cycle, the temperature inside the electrical machine 20 or other factors that may affect the current ripple. The controller 11 may determine the relative position of the rotor 101 with respect to the stator 103. The controller 11 may determine the absolute position of the rotor 101 with respect to a reference point (e.g., number of degrees or teeth from top dead center).

Figure 8:
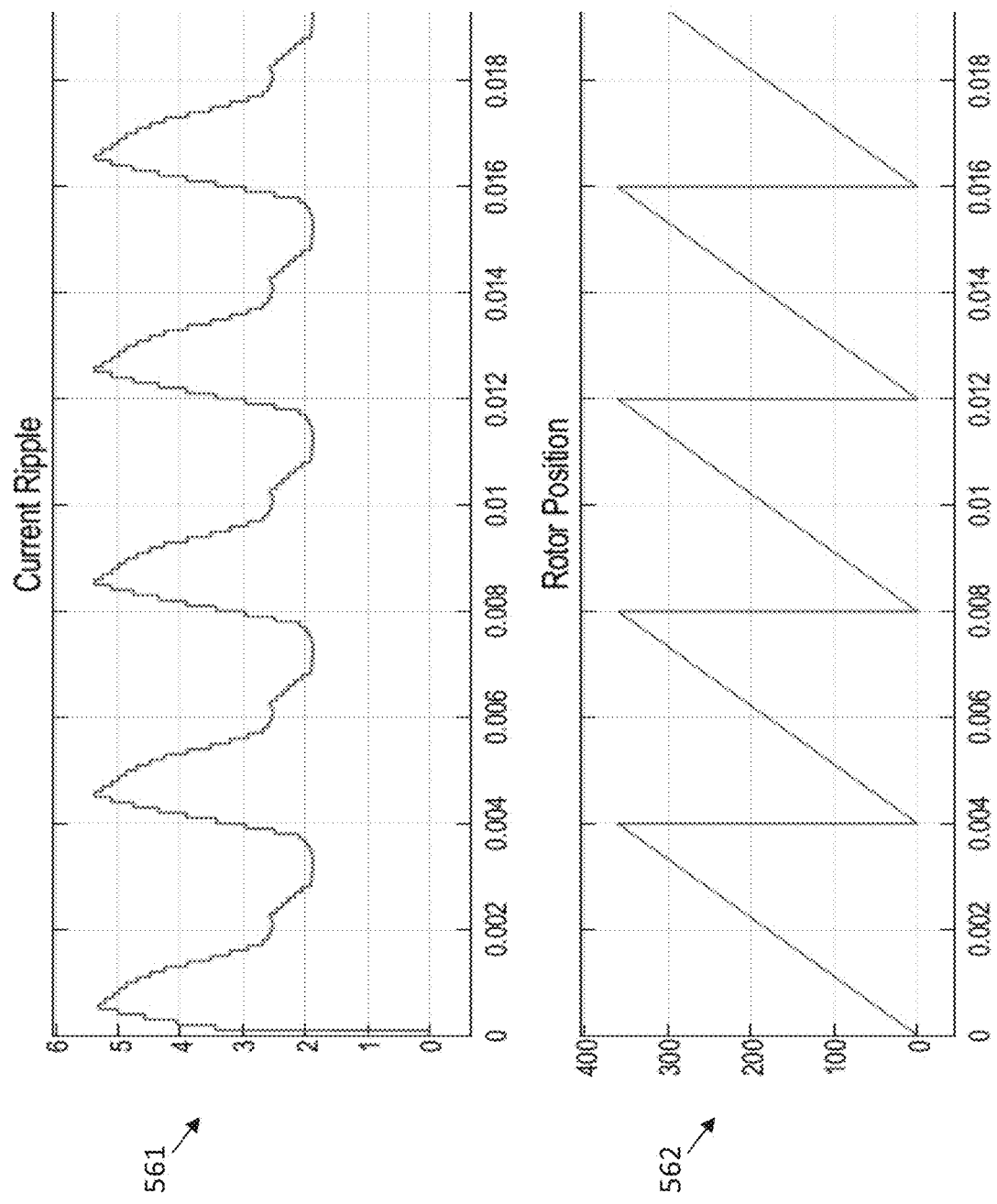
FIG. 8 illustrates a measured current ripple and a physical position of the electrical machine.

FIG. 8 provides a comparison between a measured current ripple, as shown by plot 561, and a physical position (e.g., rotor position or relative position of rotor versus the stator), as shown by plot 562, of an electrical machine. The measured current ripple (Current Ripple) is from an output waveform of an alternator with pole saliency. The physical rotor position (Rotor Position) is within the electrical machine with pole saliency. It should be apparent to one skilled in the art that there is a correlation between the waveforms represented by Current Ripple and Rotor Position.

FIG. 8 compares the physical position of the rotor as computed by a sensor to the measured ripple on the current flowing through the phase A winding in the stator 103. Changes in geometry of the electrical machine may affect the characteristics or shape of this curve. While comparing to a threshold may allow an update to the controller 11 regarding the position of the machine at a specific point, other techniques, including digital signal processing, multiple threshold comparison, Fourier transform analysis, lookup in an expected value curve and similar signal processing techniques may be employed to provide enhanced positional information from the current ripple 701 signal.

Figure 9:
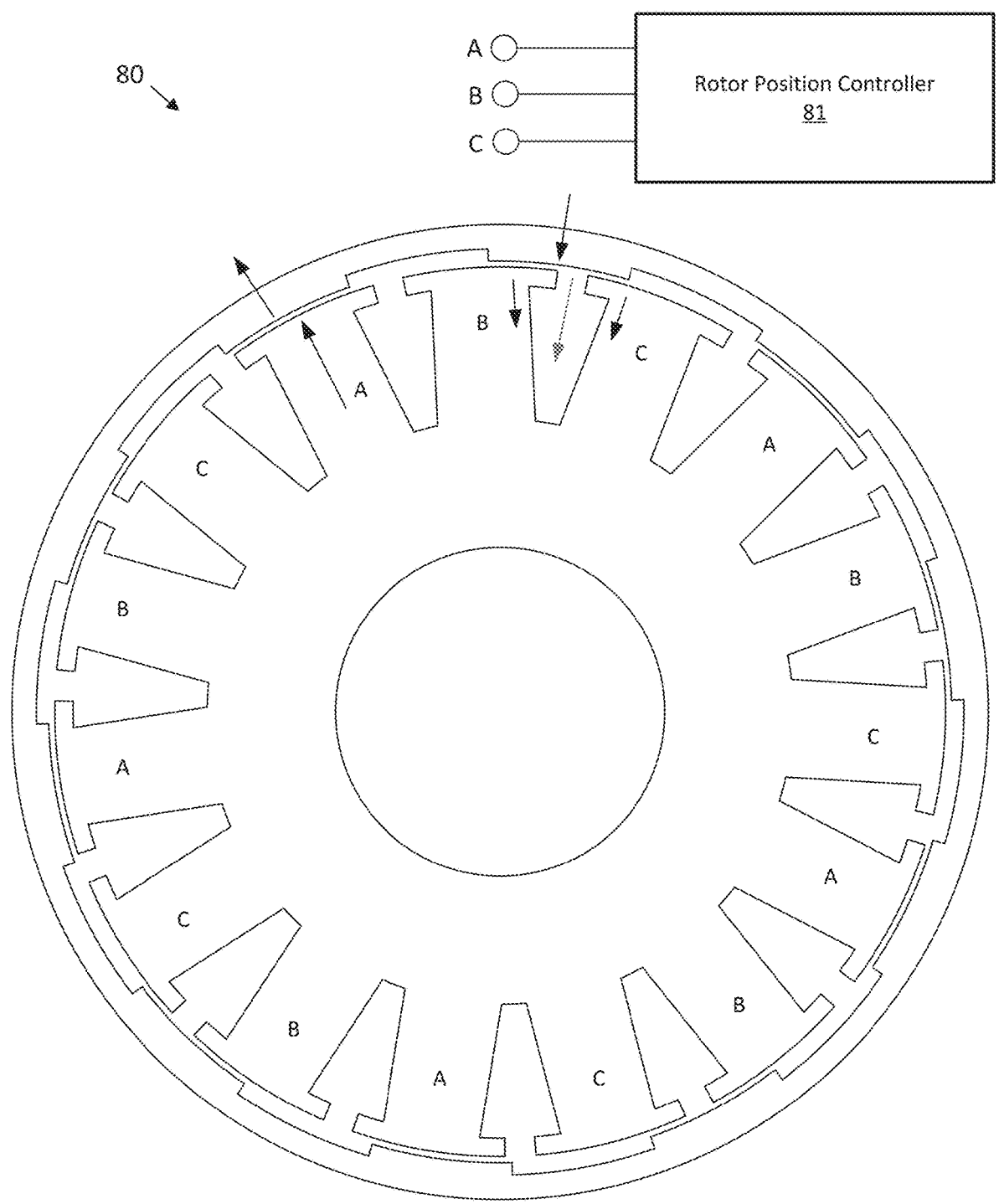
FIG. 9 illustrates a switched reluctance electrical machine configured to allow detection of rotor position using a measured current ripple.

FIG. 9 illustrates a switched reluctance electrical machine configured to allow detection of rotor position using a measured current ripple. The switched reluctance machine generates torque based on the ferro-magnetic attraction principle, working to reduce reluctance for any current-carrying path. The techniques for position detection using measured current ripple may be identical or similar to the techniques described with reference to the permanent magnet machine of FIGS. 2-4. A switched reluctance electrical machine 80 may be controlled differently than a permanent magnet electrical machine 20, but position detection may still be achieved using current ripple in both cases.

The switched reluctance electrical machine 80 may be controlled by a controller (e.g., rotor position controller 81) that is similar to controller 11 illustrated in FIG. 1. The switched reluctance electrical machine 80 may require a controller 81 that is different than the controller 11 illustrated in FIG. 1. The controller 81 may control each winding current individually, meaning that the current on phase A, phase B and phase C may not sum to 0. In this case, it may be necessary to sense the current for all three phases to achieve position feedback for all three phases. It may not be necessary to obtain position feedback from all three phases.

A variety of techniques are described for the rotor position determination that may be applied to either the permanent magnet electrical machine 20 or the switched reluctance electrical machine 80. It should be noted that the rotor position determination technique described herein is not restricted to the two machine geometries illustrated by FIGS. 2 and 9. Rotor position determination using current ripple may be applied with success to most salient pole electrical machines.

Lowest Reluctance

The controller 11 may determine the position of the rotor 101 based on a comparison of the relative current ripple on two or more phases of the electrical machine. For example, in a case where phase A is aligned with the high reluctance permanent magnet south poles 105, the current ripple will be highest in phase A. Comparing the ripple on all three phases will allow determination of which of the three phases is most in line with the permanent magnet south pole 105, allowing a resolution of ⅓ of a pole pair. For the electrical machine illustrated in FIG. 2, containing ten pole pairs, this will provide angular rotor 101 position resolution of 12 degrees (⅓ of the 36° comprising a single pole pair).

An accuracy of 12° may be adequate to control the electrical machine 20, allowing commutation to the next phase when one phase aligns with the permanent magnet south pole 105. Commutation involves choosing a phase to pass current through. Commutation may be performed by mechanical or electrical means. Commutation may be performed by the controller 11 using the switches in the switch module of circuit 10. That is, the controller 11 may determine the position of the rotor 101 then determine a command or setting for the corresponding switches so that the magnetic flux in the stator 103 leads the magnetic flux in the rotor 101.

The controller may determine the position of the rotor 101 based on multiple comparisons of current ripple on two or more phases of the electrical machine. For another example, in a case where phase C is aligned with the low reluctance consequent pole 106, the ripple current will be lowest on phase C. The minimum ripple current for phase C will occur 60 electrical degrees (6 mechanical degrees) after the maximum ripple current for phase A, adding additional resolution. Using both a minimum and a maximum comparison allows for 60 electrical degrees of sensor resolution and 6 mechanical degrees of sensor resolution.

While 6 mechanical degrees of rotor position resolution may be adequate for control of the electrical machine, this may not provide adequate resolution for control of the engine. While some ECUs will extrapolate position between position updates when receiving only 60 updates per revolution, more frequent physical updates may be helpful to reduce timing error or skew caused by sudden changes in engine speed caused by speed ripple (for engines with a low cylinder count) and large transient loads.

To increase resolution of position feedback, several techniques may be employed. The current ripple for a phase will cross an average current ripple point when the tooth 16 is halfway in line with the high reluctance permanent magnet south pole and halfway in line with the low reluctance consequent north pole 106. The position falls 90 electrical degrees from the maximum or minimum ripple condition for a phase. When adding both the leading (entering the high reluctance permanent magnet south pole 105 and leaving the high reluctance permanent magnet south pole 105) for all three phases improves the electrical resolution to 30°, potentially improving the control of the electrical machine and improves the mechanical resolution to 3°. Additionally, use of a time rate of change for the current ripple may also provide similar improvements to resolution.

Other techniques to determine rotor position, such as digital signal processing, Fourier transform analysis, comparison to a lookup table, trigonometric or mathematical modeling, or other signal processing techniques may increase resolution beyond 30 electrical degrees. In cases where better resolution is required, such techniques may justify the additional processing overhead for their computation. In some cases, this additional processing overhead may be supported by a second processor in the controller 11. In other cases, the additional processing overhead may be performed by dedicated hardware inside the processor in the controller 11. In still other cases, the additional processing overhead may be performed in a separate device from controller 11. The signal processing may not add significant processor overhead and may be performed similarly to simple threshold comparison.

As an example of a lookup table, the table may contain relative current ripple amplitude of all three phases for an electrical position range. This lookup table may provide very detailed resolution, such as 1 electrical degree (0.1 mechanical degree). The index for a new search may be referenced from the previous index to reduce lookup time. A failsafe to prevent noise from preventing next transition may be included.

As an example of a trigonometric or mathematical model, the current ripple from all three phases may be resolved to 3 vectors with a known phase relationship following a linear, squared, cubic, or logarithmic regression, such as least squares, an error optimization method like Newton's method, or another algorithm that provides a representation corresponding to a minimum error when compared to experimental results. The base angle of the resolved vectors may be closely related to the position of the rotor.

In cases where the electrical machine is coupled to a heat engine, such as an internal combustion engine, the engine position feedback for the ECU may be derived from the alternator position. While relative position indication (similar to the teeth on a wheel that are typically measured by the engine position sensor) may be related to a relative movement of the electrical machine, a means to establish absolute position of the engine may be necessary if the ECU must provide timing-critical signals at an appropriate time in the engine cycle. Some heat engines, like a turbine, may not require precise position indication.

One way to provide an absolute position is to employ an additional sensor that provide input to the ECU once per revolution of a main shaft, such as the crankshaft or once per revolution of another shaft, such as the camshaft. Another similar technique involves the removal of one of the teeth in the sensing wheel, providing an obvious anomaly that occurs only once per revolution and at a specific position of the measured shaft, which may be a main shaft or another shaft.

While large engines may have many torque producing elements, such as pistons, and provide a very consistent output or load torque, smaller engines often have fewer torque producing elements. When the engine is motoring before it begins producing power, the torque demanded by each of the cylinders of the engine may increase at some point in the engine cycle, such as the compression stroke for a 4-cycle engine. At some points in the motoring portion of the startup sequence, an engine may produce a positive torque, even when there is no combustion occurring, like during the power stroke for a 4-cycle engine.

In some cases, a change in the torque required or produced by a rotating heat engine may be observed by a controller 11 controlling an electric machine 20 connected to the rotating heat engine. If the controller 11 of the electric machine 20 is configured to maintain a constant speed, the change in engine torque may be detected by a change in current. If the controller 11 of the electric machine 20 is configured to maintain a constant torque, the change in engine torque may be detected by a change in engine speed.

Changes in engine torque may occur at specific positions of the main shaft in the engine. Changes in engine torque may occur at specific positions of an engine cycle, such as the 720° cycle of a 4-cycle engine. Each cylinder in a multi-cylinder engine may cause a sudden change in engine torque when it is in a specific position, such as crossing past top dead center (TDC) following a compression stroke. To detect a specific cylinder in a specific position, it may be necessary to have observable differences between the waveforms detected by the alternator.

As an example, the 10-pole pair electric machine of FIG. 2 may be coupled to an example 6-cylinder reciprocating piston diesel engine. For the example engine, the torque demand changes three times per revolution of the engine, each 120 mechanical degrees distant from each other. Because the alternator has 10 pole pairs, 36 mechanical degrees equates to 360 electrical degrees, meaning that 120 mechanical degrees corresponds to 1200 electrical degrees, which constitutes three full cycles and an additional 120 electrical degrees.

For the example engine coupled to the alternator of FIG. 2, the cylinders follow a prescribed firing order, 1-5-3-6-2-4, thus the torque spikes for a given revolution will either be caused by cylinders 1, 3 and 5 or by cylinders 2, 4 and 6. With the engine positioned in a certain orientation relative to the alternator, the sudden change in torque related to cylinder 1 may occur with the high reluctance permanent magnet south pole 105 aligned with phase A, while the sudden change in torque related to cylinder 3 may occur with the high reluctance permanent magnet south pole 105 aligned with phase B, and the sudden change in torque related to cylinder 5 may occur with the high reluctance permanent magnet south pole 105 aligned with phase C. Due to the correlation with difference phases in the electrical machine, the three cylinders may be differentiable, meaning that a determination may be possible as to which of the above cylinders caused the resulting torque spike.

Due to the firing order of the example 6-cylinder engine, cylinders 1 and 6, 2 and 5 and 3 and 4 will occur at the same electrical machine position because they occur at the same crankshaft position (just alternating cycle). In this case, an additional sensor or additional steps may be required if engine cycle position is required in addition to engine crankshaft position. Injecting fuel to a specific cylinder which may be undergoing the power stroke, such as cylinder 1 when one of cylinder 1 or cylinder 6 is undergoing a power stroke may allow observation of fuel burn to determine if that piston was undergoing the power stroke or the intake stroke. Injecting on the subsequent revolution after a no-burn injection should result in firing, establishing the position of the engine. Other techniques are possible.

For an example 4-cylinder reciprocating piston diesel engine, with firing order 1-3-4-2, the electrical machine may have to differ from the electrical machine 20 in FIG. 2. With an even number of pole pairs, the timing between the sudden torque change from cylinder #1 and cylinder #4 at top dead center and the sudden torque change from cylinder #2 and cylinder #3 at top dead center may occur with the same phase in alignment with the high reluctance permanent magnet south pole 105. An odd number of pole pairs will cause the sudden change in torque from cylinders 1 and 4 to occur when the high reluctance permanent magnet south pole 105 in alignment with a different phase than when the sudden change in torque from cylinders 2 and 3. This allows determination of the position of the crankshaft. Differentiation between cylinders will rely on a second sensor or similar logic to that used for the 6-cylinder.

For an example engine 3-cylinder reciprocating piston engine with 120 mechanical degrees between each throw on the crankshaft, the engine cycle timing may be calculated similarly to the six-cylinder engine, only without the need for an additional step. For the example 3-cylinder engine, only one piston is approaching top dead center for each position of the crankshaft, so the determination of engine cycle position follows from the aligned phase when the sudden change in torque occurs.

For an example two-cylinder reciprocating piston diesel engine where both pistons reach top dead center at the same time, with one completing the compression stroke and the other completing the exhaust stroke, but only one firing, the crankshaft position follows from the timing of the sudden change in torque, but the individual piston differentiation will require and addition sensor or steps similar to the 6-cylinder engine.

For an example two-cylinder engine reciprocating piston engine where both pistons do not reach top dead center at the same time, such as an odd fire engine or a v-twin, the difference in timing between the sudden changes in torque may allow determination of engine cycle position without additional sensors.

Figure 10:
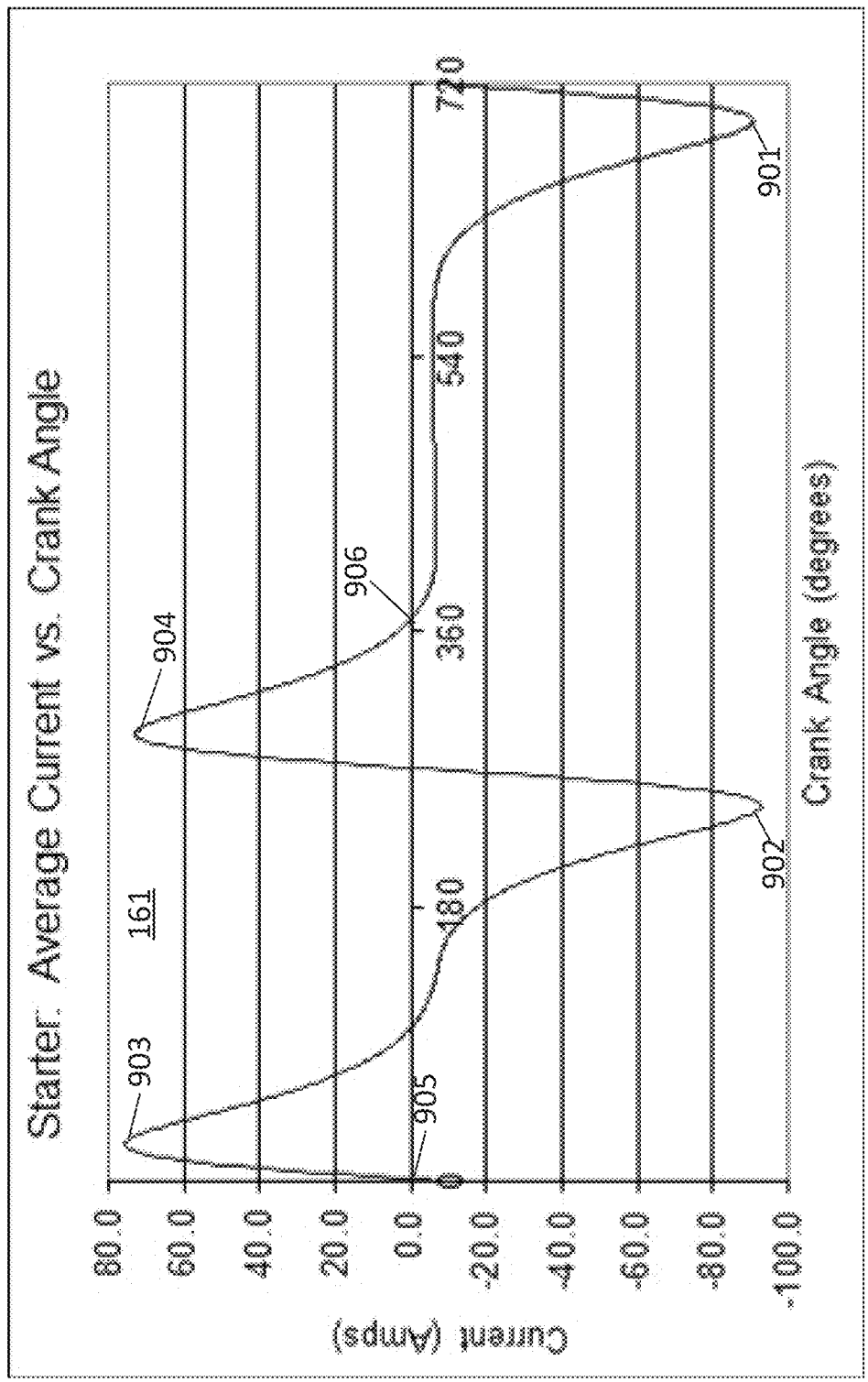
FIG. 10 illustrates an example plot for the change in total current produced by an electrical machine as a function of engine cycle position.

FIG. 10 illustrates a plot 161 for the change in total current produced by an electrical machine 20 as a function of engine cycle position. The current remains low during the intake and exhaust strokes and peaks toward the end of the compression stroke for cylinder #1 at point 901 (local minimum) and the compression stroke for cylinder #1 902 (local minimum), suddenly changing to a positive current (positive torque from the engine) as the piston passes top dead center, producing power as the compressed gas expands in cylinder #1 903 (local maximum) and cylinder #2 904 (local maximum). The power producing peak may be significantly higher if the engine is combusting fuel.

The example engine of FIG. 10 allows detection of engine position by observing the alignment between high reluctance permanent magnet south pole 105 and the respective phases of the stator when cylinder #1 is at top dead center 905 (zero crossing) and when cylinder #2 is at top dead center 906 (zero crossing). Subsequent engine position can be tracked through the change in the position of the rotor.

The engine position may be passed to the ECU by emulating a speed sensor with the alternator controller 11. The engine position may be passed to the ECU through communication with the alternator controller 11, the alternator controller 11 and the ECU may both reside on a common processor. Other combinations are possible.

Hybrid Engine Operation

The engine-generator may be part of a hybrid engine for a hybrid vehicle or another type of hybrid device. The engine-generator is a hybrid device where the alternator operates as a motor in some instances and a generator in some instances. Power generated while operating as the generator may be stored in batteries or another storage apparatus and applied later to the motor.

The controller 11 determines the position of the rotor 101 according to any of the examples above. From the position, the controller 11 may control a hybrid device by moving the device from motor mode to generator mode by controlling the position. To operate in motor mode, torque is provided to the engine, and the controller 11 selects a commanded position of the rotor 101 so that magnetic flux in the stator 103 is leading the magnetic flux in the rotor 101. To operate in generator mode, torque is taken from the engine, and the controller 11 selects a commanded position of the rotor 101 so that magnetic flux in the rotor 101 is leading the magnetic flux in the stator 103.

Figure 11:
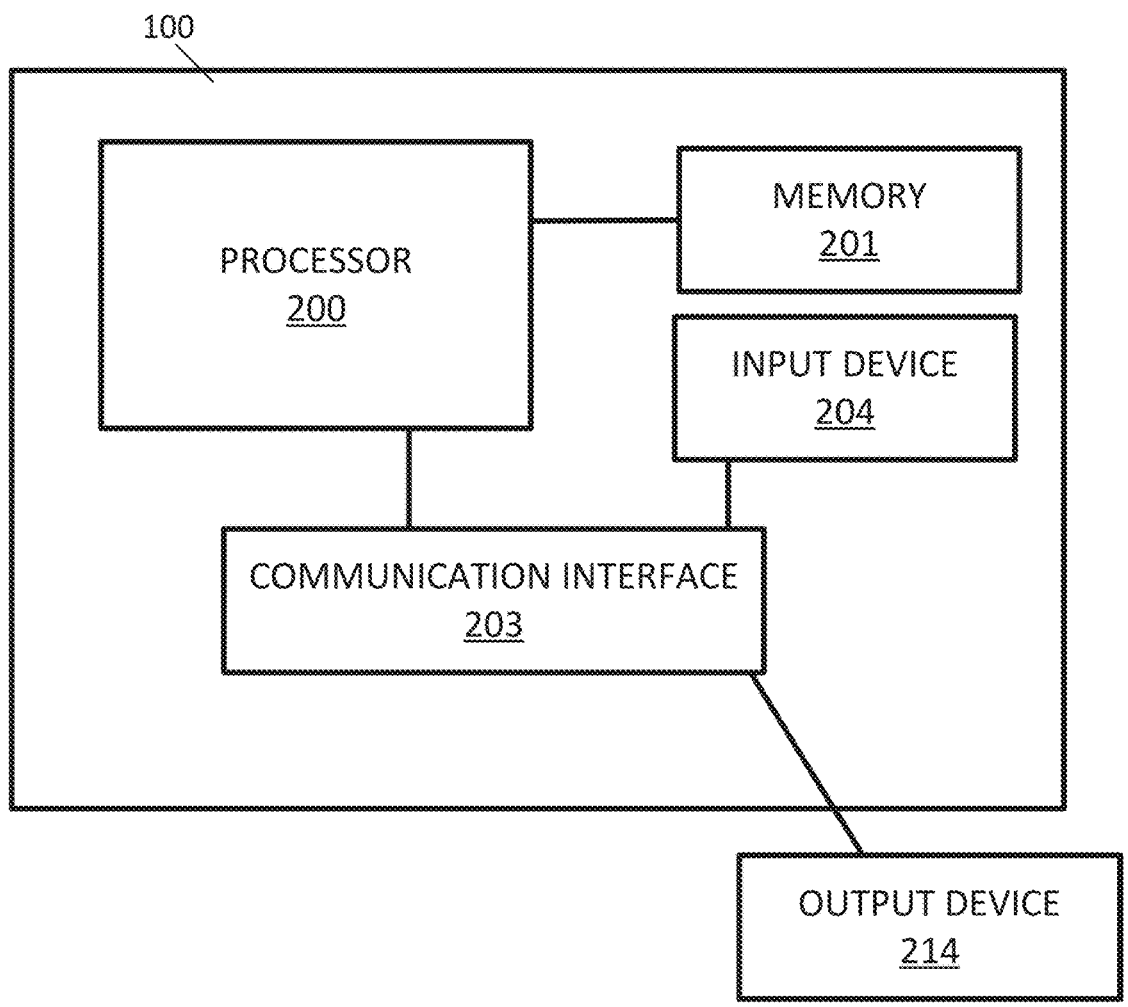
FIG. 11 illustrates an example controller for position detection in an electrical machine.

FIG. 11 illustrates an example controller 100, which may be applied as rotor position controller 11 or rotor position controller 81. The controller may include a processor 200, a memory 201, and a communication interface 203. The communication interface 203 may communicate with a parallel input signal 210, a sensor input signal 212, a display device 214, and/or an input device 204. Additional, different, or fewer components may be included.

The controller 100 may receive data from a sensor input signal 212 generated at a sensor for a rotor having a plurality of salient poles arranged radially around a rotation axis of the electric machine and spaced apart from the rotation axis of the electric machine. The rotor is rotatable and spaced by a gap with a stator having a plurality of coils configured to selectively align with the plurality of salient poles of the rotor.

The controller 100 or at least one measurement circuit connected to the controller 100 is configured to measure at least one current through at least one of the plurality of coils. The measured current includes a current ripple. The controller 100 may calculate the current ripple is a difference between a maximum current value over a predetermined time period and a minimum current value over the predetermined time period. The predetermined time period is derived from a switching frequency for an applied signal for a drive circuit for the stator.

The controller 100 configured to compute a position of the rotor based on a characteristic of the current ripple. In some examples, the controller 100 generates a paralleling signal in response to the computed position. In one example, the controller 100 controls multiple paralleled generators. The detected position of the rotor in one generated may be sent, via the parallel input signal 210, to another generator. The generators may be controlled to start, or otherwise operate, in synchronization in response to the parallel input signal 210. The controller 100 may also receive such a parallel input signal 210 from another generator. In any of theses cases, the controller 100 may also generate a command for the electric machine in response to the calculated position of the rotor. The command may turn on or off one or more switches of a driving circuit for the stator so that the magnetic flux in the stator leads (has a predetermined different phase shift) the magnetic flux in the rotor and the speed of the rotor may be set or maintained.

The display device 214 may present alphanumeric values that describe the current ripple measured by the controller 100. The display device 214 may present values that represent the parallel input signal 210 or the sensor input signal 212. The display device 213 may provide status for the control of the stator commands.

The input device 204 may be configured to receive input from a user based on one or more thresholds described herein. For example, the user may set the time period for measuring the current ripple.

Figure 12:
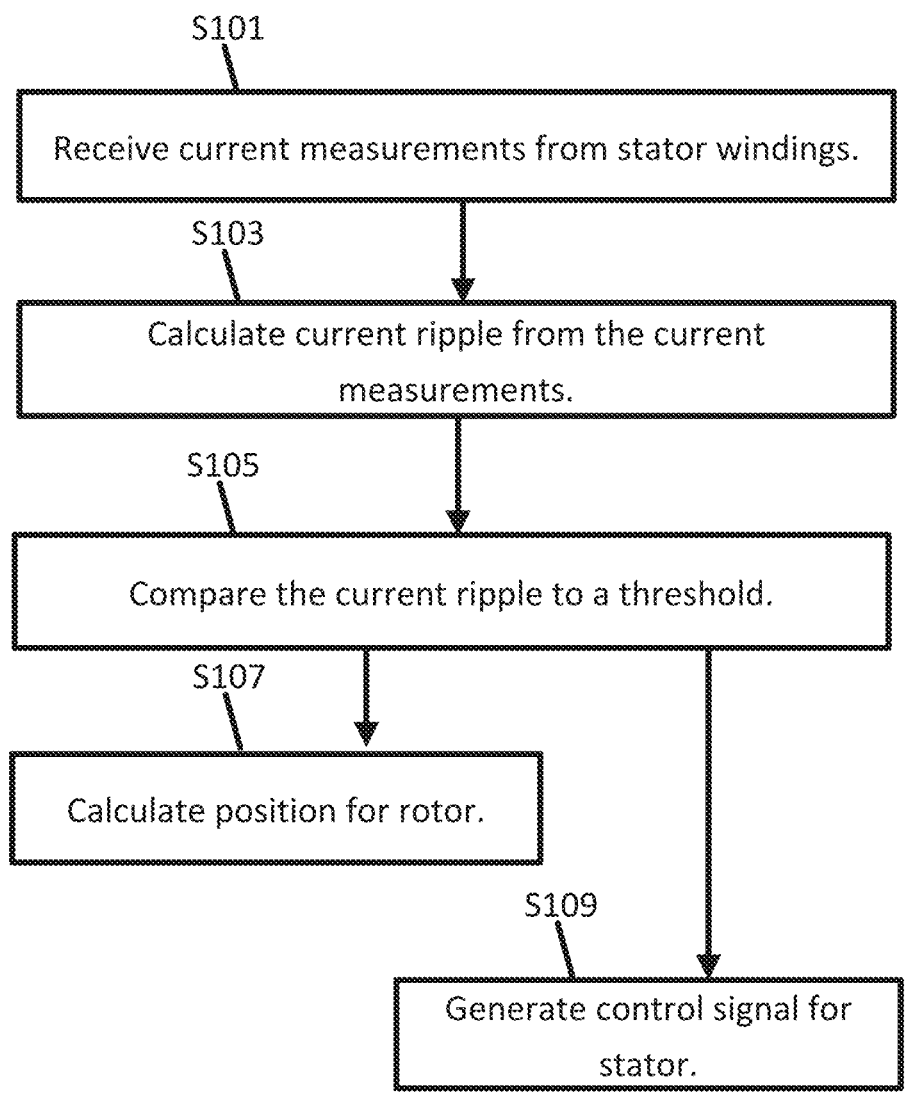
FIG. 12 illustrates an example flow chart for operation of the controller of FIG. 11.

FIG. 12 illustrates an example flow chart for operation of the controller 100. Additional, different, or fewer acts may be included.

At act S101, the controller 100 receives current values for at least one phase of stator windings. The stator windings may include at least one set of stator windings for a first phase (e.g., phase A), at least one set of stator windings for a second phase (e.g., phase B), and at least one set of stator windings for a third phase (e.g., phase C). The first phase may correspond to a first pair of switches in a driving circuit, the second phase may correspond to a second pair of switches in a driving circuit, and the third phase may correspond to a third pair of switches in a driving circuit.

A measurement circuit may include circuitry configured to measure at least one set of the stator windings. The circuitry may include an ammeter or other current sensor. The current may vary based on magnetic properties of the circuit such as the reluctance for the magnetic flux path through the iron associated with the tooth of the stator for the phase and the portion of the rotor aligned with the tooth of the stator. The measurement circuit circuitry is a means for current values for at least one phase of stator windings.

At act S103, the controller 100 calculates a current ripple based on the current values for the at least one phase of stator windings. The current ripple is a deviation in the current detected by the measurement circuit. The current ripple may be calculated as a difference between a local maximum and a local minimum within a time period. The current ripple may be defined as a deviated from the average current over the time period. The processor 200 is an example means for calculating a current ripple.

At act S105, the controller 100 compares the current ripple to a threshold. The controller 100 may determine whether the current ripple exceeds the threshold. The controller 100 may also adjust the threshold over time or based on one or more detected parameters. The threshold may be adjusted based on ambient temperature (e.g., as determined by a temperature sensor), the model of the electric machine, the materials of the electric machine. The controller 100 may monitor the output and set the threshold based on past data such as a historical average or a rolling average of the current ripple. Multiple thresholds may be used. In some examples, an array of threshold values each corresponding to a particular rotor position may be used by the controller 100. The processor 200 is an example means for comparing the current ripple to a threshold.

At act S107, in one example, the controller 100 calculates a position for the rotor in response to the comparison. The threshold used in the comparison may correspond to a particular position of the rotor. When the threshold is met, or when the controller 100 determines the current ripple is closest to a particular thresholds, the corresponding position is determined or calculated. The processor 200 is an example means for calculating a position for the rotor.

At act S109, in another example, the controller 100 generates an applied signal for the stator in response to the comparison. That is, once the position of the rotor is determined, the controller 100 controls the relative position of the rotor and the stator, for example, to maintain a speed between the stator and the rotor. The processor 200 is an example means for generating an applied signal for the stator.

In other examples, the controller generates a command for an auxiliary device in response to the determined position. Example auxiliary devices include a fuel injector, an ignition device, and/or an emissions control device in response to thee determined position.

The processor 200 may include a general processor, digital signal processor, an application specific integrated circuit (ASIC), field programmable gate array (FPGA), analog circuit, digital circuit, combinations thereof, or other now known or later developed processor. The processor 200 may be a single device or combinations of devices, such as associated with a network, distributed processing, or cloud computing.

The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 203 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 201) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory.

Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:
1. An electric machine comprising:
a rotor having a plurality of salient poles arranged radially around a rotation axis of the electric machine and spaced apart from the rotation axis of the electric machine;
a stator having a plurality of coils configured to selectively align with the plurality of salient poles of the rotor;
a first measurement circuit configured to measure at least one current through a first phase or a first coil of the plurality of coils, wherein the measured current includes a current ripple;
a second measurement circuit configured to measure at least one current through a second phase or a second coil of the plurality of coils, wherein the measured current includes a current ripple; and
a controller configured to compute a characteristic of the current ripples of the measured currents from the first and second measurement circuits;
wherein the controller is configured to calculate a first current ripple for the first phase from the first measurement circuit and calculate a second current ripple for the second phase from the second measurement circuit; and wherein the controller is configured to select a highest value between the first current ripple and the second current ripple to determine a position of the rotor.

2. The electric machine of claim 1, wherein the current ripple is a difference between a maximum current value over a predetermined time period and a minimum current value over the predetermined time period.

3. The electric machine of claim 2, wherein the predetermined time period is derived from a switching frequency for an applied signal for a drive circuit for the stator.

4. The electric machine of claim 1, wherein the controller is configured to determine a direction of the rotor based on the first current ripple for the first phase the second current ripple for the second phase.

5. The electric machine of claim 1, wherein the controller identifies a highest reluctance path based on the first current ripple and the second current ripple and select a rotor position based on the highest reluctance path.

6. The electric machine of claim 1, wherein the controller is configured to calculate a ripple for a third phase from an output of the first measurement circuit and the output of the second measurement circuit.

7. The electric machine of claim 1, wherein the controller is configured to generate a command for the electric machine in response to the calculated position of the rotor.

8. The electric machine of claim 1, wherein the controller is configured to calculate a speed for rotor.

9. The electric machine of claim 1, wherein the electric machine is a permanent magnet machine or a switched reluctance machine.

10. The electric machine of claim 1, wherein the electric machine is an induction machine.

11. A method for operation of an electric machine, the method comprising:
receiving current values for first and second phases of stator windings;
calculating first and second current ripples based on the current values for the first and second phases of stator windings;
estimating a position of the electric machine based on the first and second current ripples, the position determined at least in part by selecting the highest value between the first current ripple and the second current ripple; and
generating an applied signal for the stator in response to the estimated position.

12. The method of claim 11, wherein the estimating the position is based on measurements from another time period.

13. The method of claim 11, wherein the estimating the position comprises a comparison of the current ripple with a constant value.

14. The method of claim 13, wherein the comparison indicates a rate of change in the current ripple.

15. A hybrid device comprising:
an engine; and
an electric machine comprising:
a rotor having a plurality of salient poles arranged radially around a rotation axis of the electric machine and spaced apart from the rotation axis of the electric machine;
a stator having a plurality of coils configured to align with one or more of plurality of salient poles of the rotor at specific rotor positions;
first and second measurement circuits configured to measure first and second currents through first and second coils of the plurality of coils, wherein the measured first and second currents each includes a current ripple; and
a controller configured to determine alignment of one or more salient poles of the rotor with one or more of the plurality of stator coils and determine a position of the engine;
wherein the controller is configured to calculate a first current ripple for the first coil from the first measurement circuit and calculate a second current ripple for the second coil from the second measurement circuit; and
wherein the controller identifies a highest reluctance path based on the first current ripple and the second current ripple and selects a rotor position based on the highest reluctance path.

16. The hybrid device of claim 15, wherein the controller is configured to generate a command for a fuel injector, an ignition device, or an emissions control device in response to the determined position.

* * * * *